US009807747B2

(12) United States Patent
Hsieh et al.

(10) Patent No.: US 9,807,747 B2
(45) Date of Patent: Oct. 31, 2017

(54) METHOD OF HANDLING DOWNLINK CONTROL INFORMATION AND RELATED COMMUNICATION DEVICE

(71) Applicant: Industrial Technology Research Institute, Hsinchu (TW)

(72) Inventors: Chia-Wen Hsieh, New Taipei (TW); Chien-Min Lee, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 92 days.

(21) Appl. No.: 13/917,610

(22) Filed: Jun. 13, 2013

(65) Prior Publication Data
US 2013/0336252 A1 Dec. 19, 2013

Related U.S. Application Data

(60) Provisional application No. 61/659,985, filed on Jun. 15, 2012.

(51) Int. Cl.
*H04L 5/00* (2006.01)
*H04W 72/04* (2009.01)

(52) U.S. Cl.
CPC ......... *H04W 72/042* (2013.01); *H04L 5/0053* (2013.01)

(58) Field of Classification Search
CPC ....... H04L 5/001; H04L 5/0053; H04L 47/11; H04L 5/003; H04L 5/0094; H04W 72/042; H04W 28/12; H04W 24/10; H04W 28/04; H04W 72/00; H04W 72/0453
USPC ......... 370/329, 328, 252; 455/450, 509, 464
See application file for complete search history.

(56) References Cited

U.S. PATENT DOCUMENTS

| | | | |
|---|---|---|---|
| 8,280,389 B1* | 10/2012 | Turtinen et al. | 455/450 |
| 8,843,168 B2* | 9/2014 | Wang | H04L 5/003 370/241 |
| 2009/0252075 A1 | 10/2009 | Ji | |
| 2009/0252077 A1 | 10/2009 | Khandekar | |
| 2009/0259909 A1 | 10/2009 | Luo | |
| 2009/0290597 A1 | 11/2009 | Baumgartner | |
| 2010/0172318 A1 | 7/2010 | Zhu | |
| 2010/0309865 A1* | 12/2010 | Kimura | 370/329 |
| 2011/0044391 A1 | 2/2011 | Ji | |

(Continued)

FOREIGN PATENT DOCUMENTS

| | | |
|---|---|---|
| CN | 102238692 A | 11/2011 |
| CN | 102792616 A | 11/2012 |

(Continued)

OTHER PUBLICATIONS

Huawei, Hisilicon, Considerations on the ePDCCH design, 3GPP TSG RAN WG1 Meeting #67, R1-113655, Nov. 14-18, 2011, XP050561796, San Francisco, USA.

(Continued)

*Primary Examiner* — Sai Aung
(74) *Attorney, Agent, or Firm* — Winston Hsu

(57) ABSTRACT

A method of arranging downlink (DL) control information (DCI) for a network of a wireless communication system comprises configuring first DCI for a communication device of the wireless communication system; and transmitting the first DCI in a control region of a first physical DL shared channel (PDSCH) of a first subframe of a first component carrier to the communication device.

26 Claims, 10 Drawing Sheets

(56) References Cited

U.S. PATENT DOCUMENTS

| | | | |
|---|---|---|---|
| 2011/0170496 A1* | 7/2011 | Fong | H04L 5/0053 370/329 |
| 2011/0249633 A1* | 10/2011 | Hong | H04L 5/0053 370/329 |
| 2011/0269492 A1* | 11/2011 | Wang | H04L 5/003 455/509 |
| 2011/0312328 A1* | 12/2011 | Choi | H04L 5/0062 455/450 |
| 2012/0044821 A1 | 2/2012 | Kim | |
| 2012/0054258 A1 | 3/2012 | Li | |
| 2012/0063321 A1* | 3/2012 | Chandrasekhar et al. | 370/241 |
| 2012/0120891 A1 | 5/2012 | Mazzarese | |
| 2012/0149413 A1* | 6/2012 | Pedersen | 455/501 |
| 2012/0230272 A1* | 9/2012 | Kim | H04L 1/1861 370/329 |
| 2012/0263117 A1 | 10/2012 | Love | |
| 2012/0269151 A1 | 10/2012 | Lee, II | |
| 2013/0021984 A1 | 1/2013 | Han | |
| 2013/0039284 A1 | 2/2013 | Marinier | |
| 2013/0094456 A1* | 4/2013 | Ng | H04L 5/0091 370/329 |
| 2013/0107816 A1 | 5/2013 | Iraji | |
| 2013/0182583 A1* | 7/2013 | Siomina et al. | 370/252 |
| 2013/0301608 A1* | 11/2013 | Frenne | H04W 74/004 370/331 |
| 2014/0003271 A1* | 1/2014 | Abe et al. | 370/252 |
| 2014/0086189 A1* | 3/2014 | Takeda et al. | 370/329 |

FOREIGN PATENT DOCUMENTS

| | | |
|---|---|---|
| WO | WO 2011036986 A1 * | 3/2011 |
| WO | 2013173967 A1 | 11/2013 |

OTHER PUBLICATIONS

Motorola Mobility, EPDCCH Design Aspects, 3GPP TSG RAN WG1 Meeting #68bis, R1-121583, Mar. 26-30, 2012, pp. 1-3, XP050599847, Jeju, Korea.

Apple Inc., On the Structure and Usage Scenarios of ePDCCH, 3GPP TSG RAN WG1 Meeting #67, R1-114300, Nov. 14-18, 2011, pp. 1-9, XP050562351, San Francisco, USA.

Texas Instruments, On multiplexing of ePDCCH with PDSCH, 3GPP TSG RAN WG1 Meeting #67, R1-113792, Nov. 14-18, 2011, pp. 1-4, XP050561887, San Francisco, USA.

Fujitsu, Motivation, Requirements and Design for ePCFICH, 3GPP TSG RAN WG1 Meeting #69, R1-122074, May 21-25, 2012, pp. 1-4, XP050600363, Prague, Czech Republic.

Samsung, ePHICH design for Rel-11, 3GPP TSG RAN WG1 Meeting #69, R1-122258, May 21-25, 2012, pp. 1-5, XP050600521, Prague, Czech Republic.

Samsung, Enhanced PCFICH, 3GPP TSG RAN WG1 #69, R1-122261, May 21-25, 2012, pp. 1-4, XP050600524, Prague, Czech Republic.

* cited by examiner

FIG. 6

| Modulation Order | Number of PRBs of the PDSCH | | | | | | | |
|---|---|---|---|---|---|---|---|---|
| | ≤5 | 6-10 | 11-15 | 16-20 | 21-25 | 26-30 | 31-35 | ≥36 |
| 1 (BPSK) | a1 | b1 | c1 | d1 | e1 | f1 | g1 | h1 |
| 2 (QPSK) | a2 | b2 | c2 | d2 | e2 | f2 | g2 | h2 |
| 4 (16-QAM) | a3 | b3 | c3 | d3 | e3 | f3 | g3 | h3 |
| 5 (64-QAM) | a4 | b4 | c4 | d4 | e4 | f4 | g4 | h4 |
| >6 | a5 | b5 | c5 | d5 | e5 | f5 | g5 | h5 |

60

METHOD OF HANDLING DOWNLINK CONTROL INFORMATION AND RELATED COMMUNICATION DEVICE

CROSS REFERENCE TO RELATED APPLICATIONS

This application claims the benefit of U.S. Provisional Application No. 61/659,985, filed on Jun. 15, 2012 and entitled "Method and Apparatus to Improve Control Channel Capacity", the contents of which are incorporated herein in their entirety.

BACKGROUND OF THE INVENTION

1. Field of the Invention

The present invention relates to a method used in a wireless communication system and related communication device, and more particularly, to a method of handling downlink control information and related communication device.

2. Description of the Prior Art

A long-term evolution (LTE) system supporting the 3GPP Rel-8 standard and/or the 3GPP Rel-9 standard are developed by the 3rd Generation Partnership Project (3GPP) as a successor of a universal mobile telecommunications system (UMTS), for further enhancing performance of the UMTS to satisfy increasing needs of users. The LTE system includes a new radio interface and a new radio network architecture that provides a high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple user equipments (UEs), and communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint (COMP) transmission/reception, UL multiple-input multiple-output (MIMO), etc. For a UE and an eNB to communicate with each other in the LTE-A system, the UE and the eNB must support standards developed for the LTE-A system, such as the 3GPP Rel-10 standard or later versions.

The CA is introduced to the LTE-A system by which more than one component carriers (CCs) are aggregated to achieve a wide-band transmission. Accordingly, the LTE-A system can support a wide bandwidth up to 100 MHz by aggregating a maximum number of 5 component carriers, where a maximum bandwidth of each component carrier is 20 MHz and is backward compatible with the 3GPP Rel-8 standard. The LTE-A system supports the CA for both contiguous and non-contiguous component carriers. The CA increases bandwidth flexibility by aggregating the component carriers. When a UE is configured with the CA, the UE has the ability to receive and/or transmit packets on one or multiple component carriers to increase throughput.

When the UE is configured with the CA, the eNB may need to arrange (i.e., schedule) resources in one or more subframes of one or more component carriers to the UE. Thus, the eNB needs to spend a large amount of resources on transmitting downlink (DL) control information (DCI) to the UE, to indicate the arranged resources to the UE. However, capacity of a DL control channel (e.g., physical DL control channel (PDCCH)) is limited, and is sufficient for transmitting the DCI for arranging various resources of the subframes and the component carriers. Thus, methods for transmitting the DCI efficiently and receiving the DCI correctly are needed, and are important topics to be discussed.

SUMMARY OF THE INVENTION

The present invention therefore provides a method and related communication device for handling downlink control information to solve the abovementioned problem.

A method of arranging downlink (DL) control information (DCI) for a network of a wireless communication system comprises configuring first DCI for a communication device of the wireless communication system; and transmitting the first DCI in a control region of a first physical DL shared channel (PDSCH) of a first subframe of a first component carrier to the communication device.

A method of detecting downlink (DL) control information (DCI) for a communication device of a wireless communication system comprises receiving a control region of a first physical DL shared channel (PDSCH) of a first subframe of a first component carrier; and detecting first DCI in the control region.

A method of transmitting downlink (DL) control information (DCI) for a network of a wireless communication system method comprises combining a physical DL control channel (PDCCH) of a subframe and an enhanced PDCCH (ePDCCH) of the subframe as a combined PDCCH of the subframe; and transmitting at least one DCI in the combined PDCCH to a communication device of the wireless communication system.

A method of receiving downlink (DL) control information (DCI) for a communication device of a wireless communication system comprises detecting a combined physical DL control channel (PDCCH) of a subframe transmitted by a network of the wireless communication system, wherein the combined PDCCH comprises a PDCCH of the subframe and an enhanced PDCCH (ePDCCH) of the subframe; and detecting at least one DCI in the combined PDCCH.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 6 is a table 60 of sizes of the control region according to an example of the present invention.

DETAILED DESCRIPTION

Figure 1:
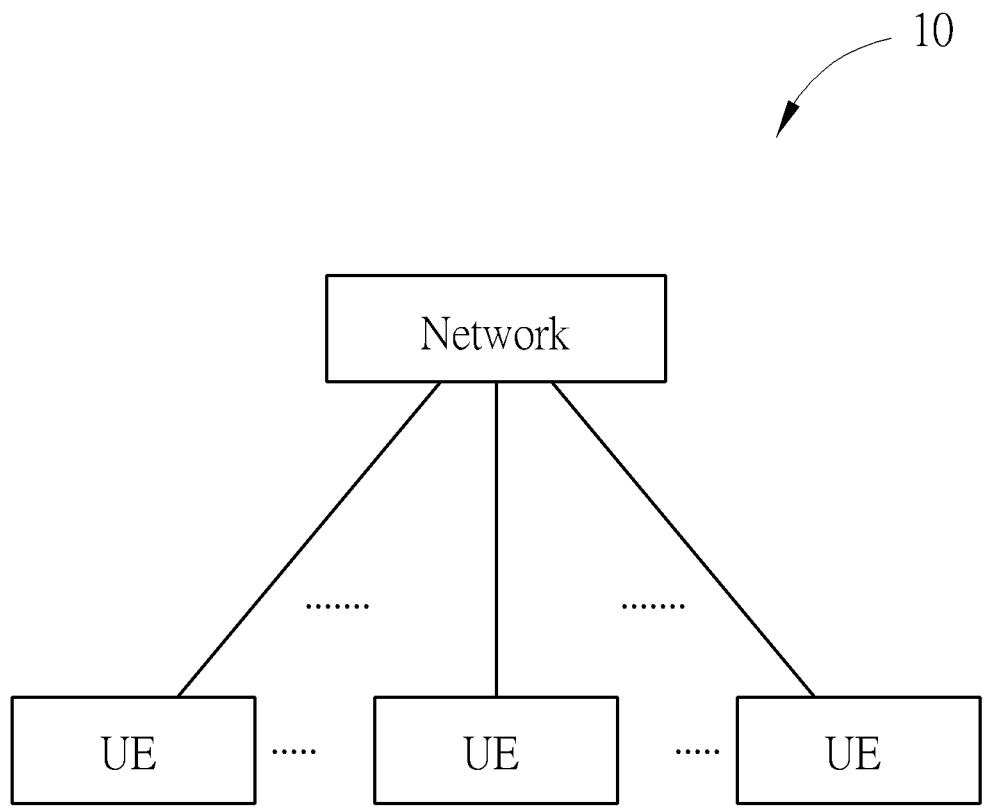
FIG. 1 is a schematic diagram of a wireless communication system according to an example of the present invention.

Please refer to FIG. 1, which is a schematic diagram of a wireless communication system 10 according to an example of the present invention. The wireless communication system 10 is briefly composed of a network and a plurality of user equipments (UEs). In FIG. 1, the network and the UEs are simply utilized for illustrating the structure of the wireless communication system 10. Practically, the network can be a universal terrestrial radio access network (UTRAN) comprising a plurality of Node-Bs (NBs) in a universal mobile telecommunications system (UMTS). In another example, the network can be an evolved UTRAN (E-UTRAN) comprising a plurality of evolved NBs (eNBs) and/or relays in a long term evolution (LTE) system, a LTE-Advanced (LTE-A) system or an evolution of the LTE-A system. In one example, the network and the UEs may support carrier aggregation (CA), and a UE can communicate with the network via multiple component carriers according to the CA.

Furthermore, the network can also include both the UTRAN/E-UTRAN and a core network, wherein the core network includes network entities such as Mobility Management Entity (MME), Serving Gateway (S-GW), Packet Data Network (PDN) Gateway (P-GW), Self-Organizing Networks (SON) server and/or Radio Network Controller (RNC), etc. In other words, after the network receives information transmitted by a UE, the information may be processed only by the UTRAN/E-UTRAN and decisions corresponding to the information are made at the UTRAN/E-UTRAN. Alternatively, the UTRAN/E-UTRAN may forward the information to the core network, and the decisions corresponding to the information are made at the core network after the core network processes the information. Besides, the information can be processed by both the UTRAN/E-UTRAN and the core network, and the decisions are made after coordination and/or cooperation are performed by the UTRAN/E-UTRAN and the core network. A UE can be a mobile phone, a laptop, a tablet computer, an electronic book or a portable computer system. Besides, the network and the UE can be seen as a transmitter or a receiver according to direction, e.g., for an uplink (UL), the UE is the transmitter and the network is the receiver, and for a downlink (DL), the network is the transmitter and the UE is the receiver.

Figure 2:
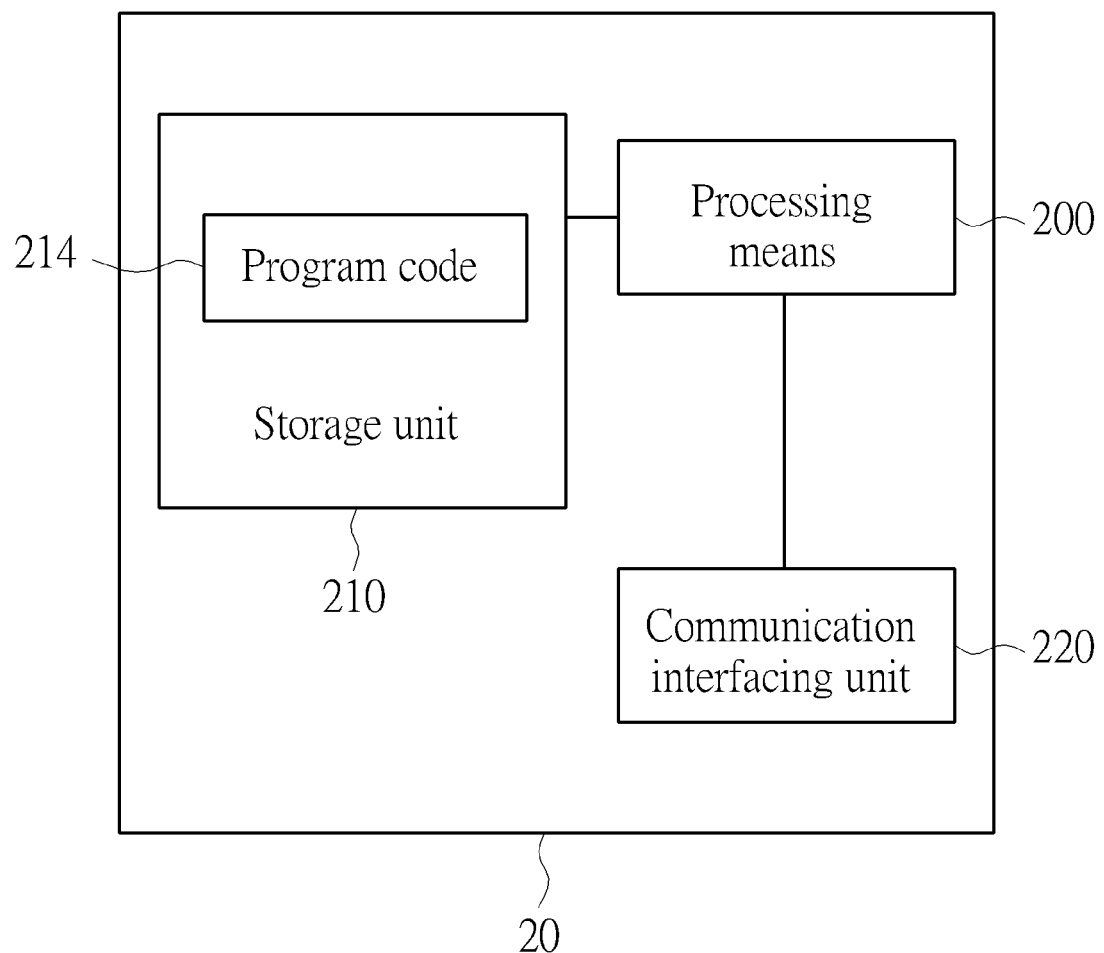
FIG. 2 is a schematic diagram of a communication device according to an example of the present invention.

Please refer to FIG. 2, which is a schematic diagram of a communication device 20 according to an example of the present invention. The communication device 20 can be a UE or the network shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that can store a program code 214, accessed and executed by the processing means 200. Examples of the storage unit 210 include but are not limited to a subscriber identity module (SIM), read-only memory (ROM), flash memory, random-access memory (RAM), CD-ROM/DVD-ROM, magnetic tape, hard disk and optical data storage device. The communication interfacing unit 220 is preferably a transceiver and is used to transmit and receive signals (e.g., messages or packets) according to processing results of the processing means 200.

Figure 3:
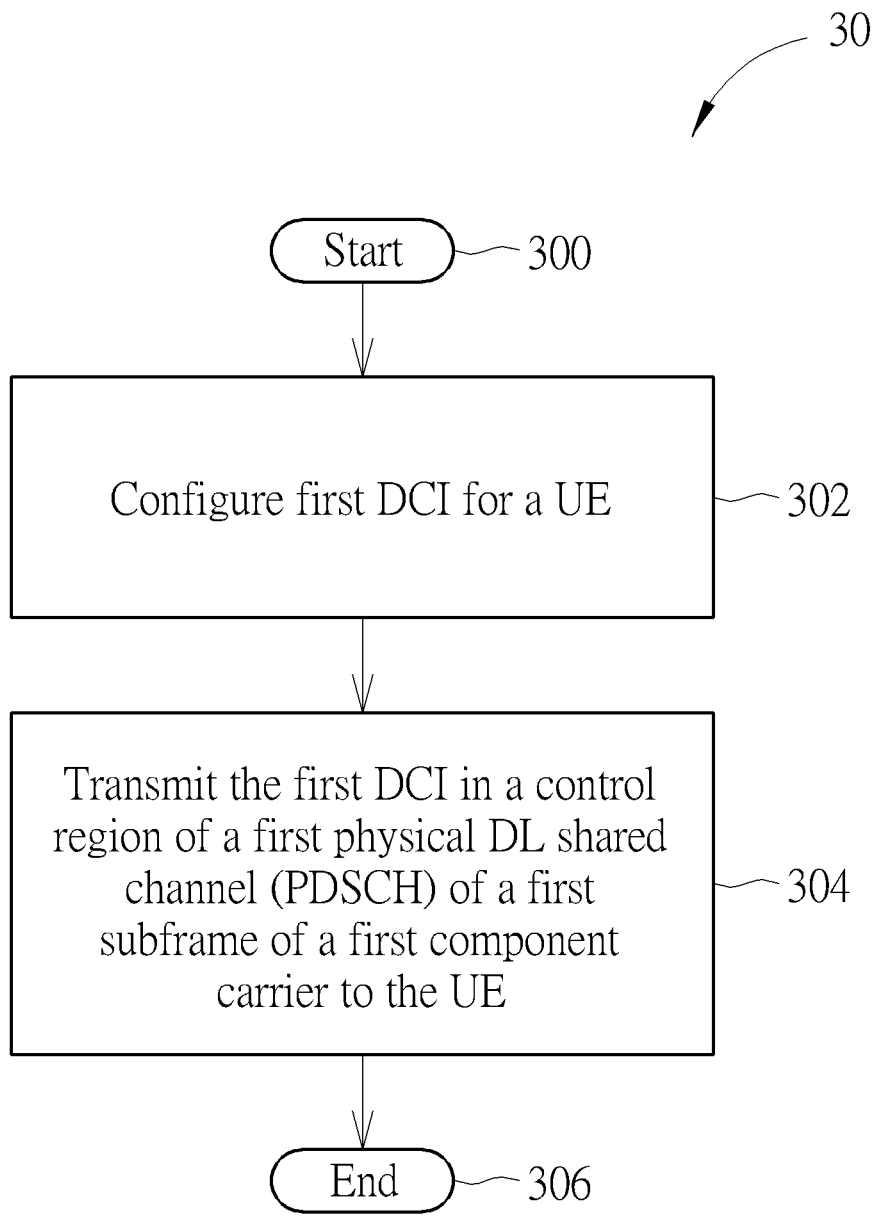
FIG. 3 is a flowchart of a process according to an example of the present invention.

Please refer to FIG. 3, which is a flowchart of a process 30 according to an example of the present invention. The process 30 can be utilized in the network shown in FIG. 1, for handling DL control information (DCI). The process 30 may be compiled into the program code 214 and includes the following steps:

Step 300: Start.

Step 302: Configure first DCI for a UE.

Step 304: Transmit the first DCI in a control region of a first physical DL shared channel (PDSCH) of a first subframe of a first component carrier to the UE.

Step 306: End.

According to the process 30, the network configures first DCI for a UE, and transmits the first DCI in a control region of a first PDSCH (e.g., a legacy PDSCH or an advanced PDSCH (a-PDSCH)) of a first subframe of a first component carrier to the UE. That is, part of the PDSCH is used for transmitting the DCI, different from the prior art where the DCI is transmitted in a physical DL control channel (PDCCH). Thus, the network can transmit the DCI flexibly and efficiently.

Figure 4:
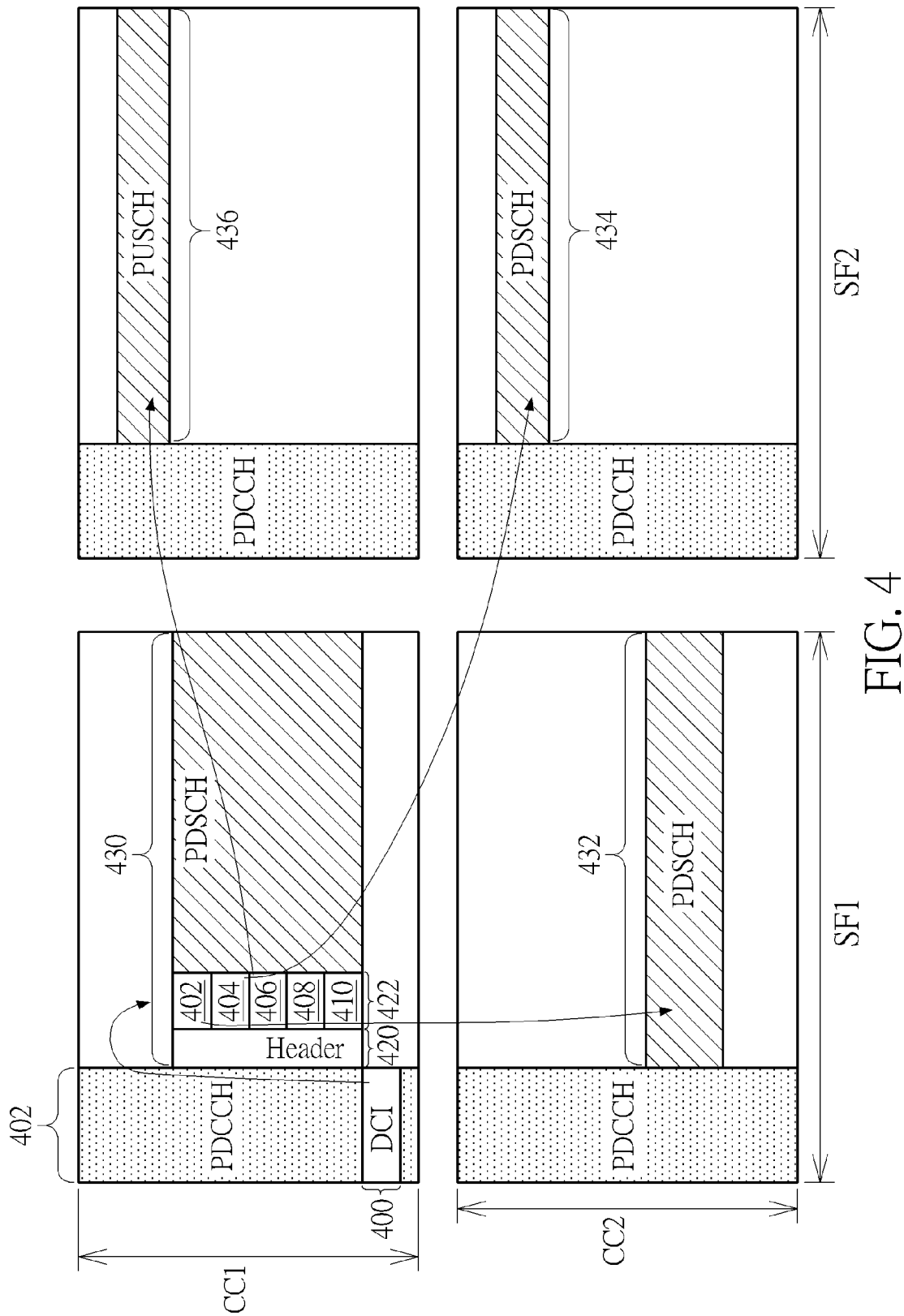
FIG. 4 is a schematic diagram of resource allocation of component carriers and subframes.

Realization of the process 30 is not limited. Please refer to FIG. 4, which is a schematic diagram of resource allocation of component carriers and subframes. As shown in FIG. 4, 2 component carriers CC1 and CC2 and 2 subframes SF1 and SF2 are considered. The component carrier CC1 maybe seen as a primary component carrier (e.g., scheduling cell) which should be monitored by the UE. Thus, the UE will not lose control information transmitted by the network in the component carrier CC1. For each of the component carriers CC1 and CC2, a PDCCH may be arranged in first few orthogonal frequency-division multiplexing (OFDM) symbols of a subframe. In the present example, the network transmits DCI 400 to the UE in a PDCCH 402 of the subframe SF1 of the component carrier CC1. The DCI 400 comprises information related to a size and/or a location of a PDSCH 430, wherein the PDSCH 430 may be a legacy PDSCH or an a-PDSCH. In addition, the network transmits a header 420 and a control region 422 including DCI 402, DCI 404, DCI 406, DCI 408 and DCI 410 in the PDSCH 430. The header 420 comprises information related to a size and/or a location of the control region 422. In one example, the DCI 402 may comprise an arrangement (e.g., DL assignment) of a PDSCH 432 of the subframe SF1 of the component carrier CC2. Preferably, the DCI 402 comprises at least one of a DCI format, an aggregation level and a candidate of the aggregation level, for indicating the PDSCH 432 to the UE. In another example, the DCI 404 may comprise an arrangement (e.g., DL assignment) of a PDSCH 434 of the subframe SF2 of the component carrier CC2. Preferably, the DCI 404 comprises at least one of a DCI format, an aggregation level and a candidate of the aggregation level, for indicating the PDSCH 434 to the UE.

When DCI (e.g., the DCI 402 or 404) comprises an arrangement of a PDSCH (e.g., the PDSCH 432 or 434), hybrid automatic repeat request (HARQ) resource for transmitting a HARQ corresponding to the PDSCH can be determined (e.g., by the network) according to a location of the DCI and/or a location of the PDSCH. For example, the location of the PDSCH may be an index of a resource block (RB), wherein the index is the lowest among indices of RBs used for transmitting the PDSCH. In another example, the location of the DCI may be an index of a control channel element (CCE), wherein the index is the lowest among indices of CCEs used for transmitting the DCI.

In another example, the DCI 406 may comprise an arrangement (e.g., UL grant) of a physical UL shared channel (PUSCH) 436 of the subframe SF2 of the component carrier CC1. Note that when the DCI 406 in the subframe SF1 is used for indicating the PUSCH 436 of the subframe SF2, a time delay may be needed between the subframe SF1 and the subframe SF2. For example, the time delay may be 4 subframes, i.e., if an index of the subframe SF1 is n, an index of the subframe SF2 is (n+4). In another example, the DCI 408 may comprise an indication for power control of the UE, e.g., for indicating the UE to adjust or keep its transmission power. In another example, the DCI 410 may comprise a HARQ corresponding to a PUSCH transmitted in a previous frame. That is, the network can transmit the HARQ to the UE via the DCI 410, for responding the PUSCH.

Please note that, the PDSCH for transmitting the DCI (e.g., the DCI 402 or 404) and the PDSCH to be arranged may be in the same or different subframes, and maybe in the same or different component carriers. Similarly, the PDSCH for transmitting the DCI (e.g., the DCI 406) and the PUSCH to be arranged may be in different subframes, and may be in the same or different component carriers. In addition, a modulation and coding scheme (MCS) of the header 420 and the control region 422 can be different from a MCS of data transmitted in the PDSCH 430. That is, the MCS for encoding the header 420 and the control region 422 and the MCS for encoding the data transmitted in the PDSCH 430 does not need to be the same (but can be the same according to system requirements or design considerations).

Correspondingly, the UE can detect the DCI 400 in the PDCCH 402, and receive the PDSCH 430 according to the DCI 400. Then, the UE can detect the header 420 in the PDSCH 430. Since the header 420 comprises the information related to the size and/or the location of the control region 422, the UE can receive the control region 422 according to the information in the header 420, and detect the DCI 402 (or the DCI 404, 406, 408 or 410) in the control region 422. For example, the UE may perform blind detections (e.g., blind decodings) in the control region 422 to detect the DCI 402 (or the DCI 404, 406, 408 or 410). In one example, after the UE detects the DCI 402, the UE obtains at least one of the DCI format, the aggregation level and the candidate of the aggregation level in the DCI 402. The UE can detect the PDSCH 432 according to the information in the DCI 402, e.g., perform receptions of data in the PDSCH 432. In another example, after the UE detects the DCI 404, the UE obtains at least one of the DCI format, the aggregation level and the candidate of the aggregation level in the DCI 404. The UE can detect the PDSCH 434 according to the information in the DCI 404, e.g., perform receptions of data in the PDSCH 434. In another example, after the UE detects the DCI 406, the UE obtains at least one of the DCI format, the aggregation level and the candidate of the aggregation level in the DCI 406. The UE can use the PUSCH 436 according to the information in the DCI 406, e.g., perform transmissions of data in the PUSCH 436. In another example, after the UE detects the DCI 408, the UE obtains the indication for the power control. The UE can adjust or keep its transmission power according to the indication. In addition, as mentioned previously, when DCI (e.g., the DCI 402 or 404) comprises an arrangement of a PDSCH (e.g., the PDSCH 432 or 434), HARQ resource for transmitting a HARQ corresponding to the PDSCH can be determined (e.g., by the UE) according to a location of the DCI and/or a location of the PDSCH. Thus, the UE can transmit the HARQ corresponding to the PDSCH by using the HARQ resource.

Figure 5:
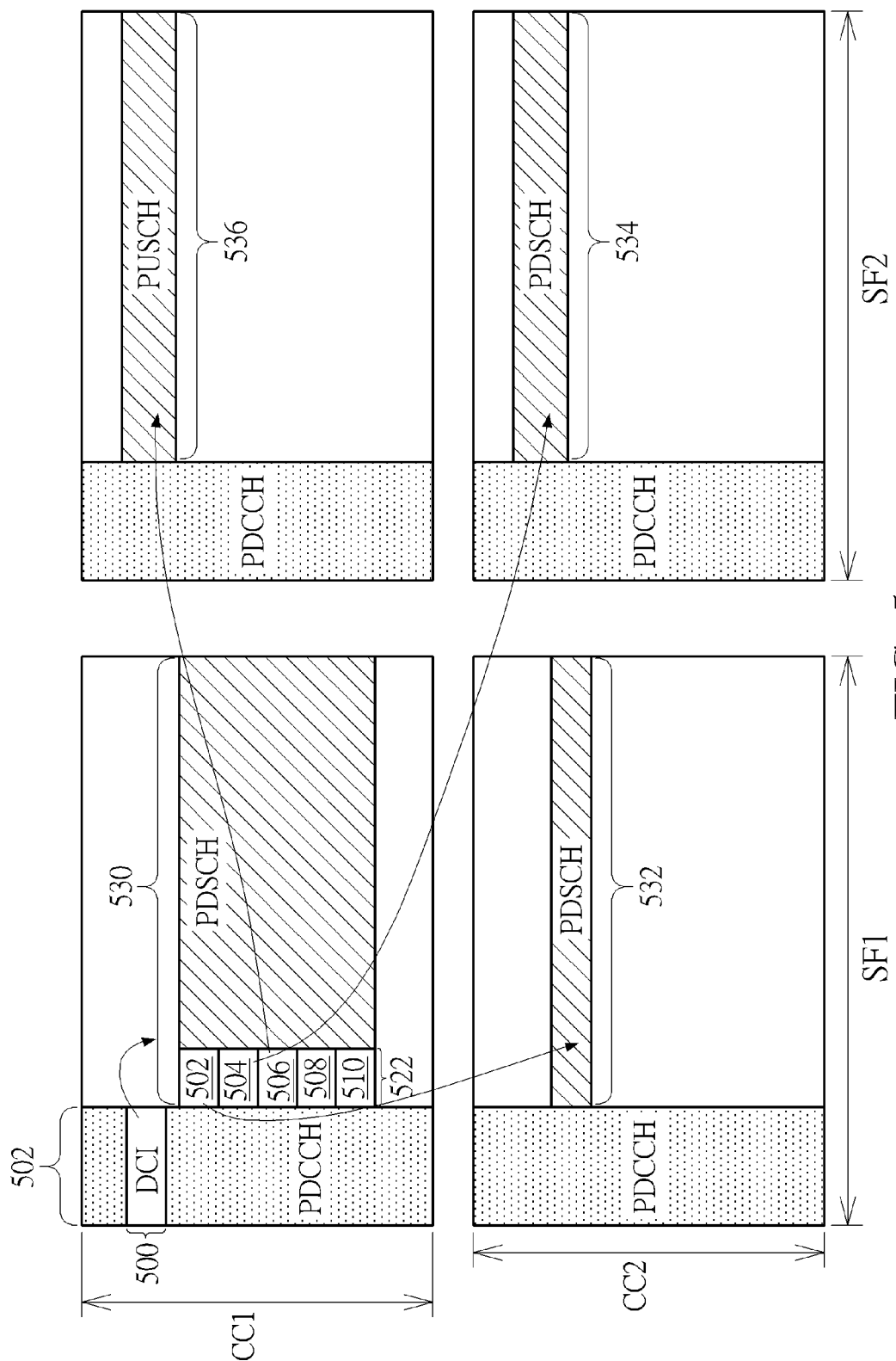
FIG. 5 is a schematic diagram of resource allocation of component carriers and subframes.

Please refer to FIG. 5, which is a schematic diagram of resource allocation of component carriers and subframes. Similar to FIG. 4, 2 component carriers CC1 and CC2 and 2 subframes SF1 and SF2 are considered in FIG. 5. The component carrier CC1 may be seen as a primary component carrier (e.g., scheduling cell) which should be monitored by the UE. Thus, the UE will not lose control information transmitted by the network in the component carrier CC1. For each of the component carriers CC1 and CC2, a PDCCH may be arranged in first few OFDM symbols of a subframe. In the present example, the network transmits DCI 500 to the UE in a PDCCH 502 of the subframe SF1 of the component carrier CC1. The DCI 500 comprises information related to a size and/or a location of a PDSCH 530. Note that the DCI 500 may include at least one legacy field and at least one field newly added, wherein the at least one field newly added may further include information related to a size and/or a location of a control region 522. The control region 522 including DCI 502, DCI 504, DCI 506, DCI 508 and DCI 510 is transmitted by the network to the UE in the PDSCH 530. In one example, the DCI 502 may comprise an arrangement (e.g., DL assignment) of a PDSCH 532 of the subframe SF1 of the component carrier CC2. Preferably, the DCI 502 comprises at least one of a DCI format, an aggregation level and a candidate of the aggregation level, for indicating the PDSCH 532 to the UE. In another example, the DCI 504 may comprise an arrangement (e.g., DL assignment) of a PDSCH 534 of the subframe SF2 of the component carrier CC2. Preferably, the DCI 504 comprises at least one of a DCI format, an aggregation level and a candidate of the aggregation level, for indicating the PDSCH 534 to the UE.

When DCI (e.g., the DCI 502 or 504) comprises an arrangement (e.g., DL assignment) of a PDSCH (e.g., the PDSCH 532 or 534), HARQ resource for transmitting a HARQ corresponding to the PDSCH can be determined (e.g., by the network) according to a location of the DCI and/or a location of the PDSCH. For example, the location of the PDSCH maybe an index of a RB, wherein the index is the lowest among indices of RBs used for transmitting the PDSCH. In another example, the location of the DCI may be an index of a CCE, wherein the index is the lowest among indices of CCEs used for transmitting the DCI.

In another example, the DCI 506 may comprise an arrangement (e.g., UL grant) of a PUSCH 536 of the subframe SF2 of the component carrier CC1. As mentioned previously, when the DCI 506 in the subframe SF1 is used for indicating the PUSCH 536 of the subframe SF2, a time delay may be needed between the subframe SF1 and the subframe SF2. In another example, the DCI 508 may comprise an indication for power control of the UE, e.g., for indicating the UE to adjust or keep its transmission power. In another example, the DCI 510 may comprise a HARQ corresponding to a PUSCH transmitted in a previous frame. That is, the network can transmit the HARQ to the UE via the DCI 510, for responding the PUSCH.

Please note that, the PDSCH for transmitting the DCI (e.g., the DCI 502 or 504) and the PDSCH to be arranged may be in the same or different subframes, and may be in the same or different component carriers. Similarly, the PDSCH for transmitting the DCI (e.g., the DCI 506) and the PUSCH to be arranged may be in different subframes, and may be in the same or different component carriers. In addition, a MCS of the control region 522 can be different from a MCS of data transmitted in the PDSCH 530. That is, the MCS for encoding the control region 522 and the MCS for encoding the data transmitted in the PDSCH 530 does not need to be the same (but can be the same according to system requirements or design considerations).

Correspondingly, the UE first detects the DCI 500 in the PDCCH 502, and receives the PDSCH 530 according to the DCI 500. Since the at least one field newly added in the DCI 500 comprises the information related to the size and/or the location of the control region 522, the UE can receive the control region 522 according to the information, and detect the DCI 502 (or the DCI 504, 506, 508 or 510) in the control region 522. For example, the UE may perform blind detections (e.g., blind decodings) in the control region 522 to detect the DCI 502 (or the DCI 504, 506, 508 or 510). In one example, after the UE detects the DCI 502, the UE obtains at least one of the DCI format, the aggregation level and the candidate of the aggregation level in the DCI 502. The UE can detect the PDSCH 532 according to the information in the DCI 502, e.g., perform receptions of data in the PDSCH 532. In another example, after the UE detects the DCI 504, the UE obtains at least one of the DCI format, the aggregation level and the candidate of the aggregation level in the DCI 504. The UE can detect the PDSCH 534 according to the information in the DCI 504, e.g., perform receptions of data in the PDSCH 534. In another example, after the UE detects the DCI 506, the UE obtains at least one of the DCI format, the aggregation level and the candidate of the aggregation level in the DCI 506. The UE can use the PUSCH 536 according to the information in the DCI 506, e.g., perform transmissions of data in the PUSCH 536. In another example, after the UE detects the DCI 508, the UE obtains the indication for the power control. The UE can adjust or keep its transmission power according to the indication. In addition, as mentioned previously, when DCI (e.g., the DCI 502 or 504) comprises an arrangement of a PDSCH (e.g., the PDSCH 532 or 534), HARQ resource for transmitting a HARQ corresponding to the PDSCH can be determined (e.g., by the UE) according to a location of the DCI and/or a location of the PDSCH. Thus, the UE can transmit the HARQ corresponding to the PDSCH by using the HARQ resource.

On the other hand, a size of the control region (e.g., the control region 422 or 522) for carrying one or more DCIS can be determined according to at least one of a modulation order and a size of the PDSCH (e.g., the PDSCH 430 or 530). Similarly, a size of the aggregation level can also be determined according to at least one of a modulation order and a size of the PDSCH (e.g., the PDSCH 430 or 530).

Please refer to FIG. 6, which is a table 60 of sizes of the control region according to an example of the present invention. As shown in the table 60, modulation orders and the size of the PDSCH (e.g., the PDSCH 430 or 530) are used for determine positive integers a1-a5, b1-b5, c1-c5, d1-d5, e1-e5, f1-f5, g1-g5 and h1-h5, wherein the size of the PDSCH is a number of physical resource blocks (PRBs) of the PDSCH in the present example. A positive integer can be used for determining (e.g., can be) the size of the control region (e.g., the control region 422 or 522) or the size of the aggregation level. For example, when the modulation order is 2 and the size of the PDSCH is between 11-15, the size of the control region is determined as c2.

Thus, according to the process 30 and the above description, the network can perform power control, and/or arrange resource of PDSCH and/or resource of PUSCH of various subframes and component carriers to the UE flexibly and efficiently. In addition, a number of the blind detections can be reduced, since at least one DCI (scheduled) in the PDSCH is separated from the DCI (scheduled) in the PDCCH.

Figure 7:
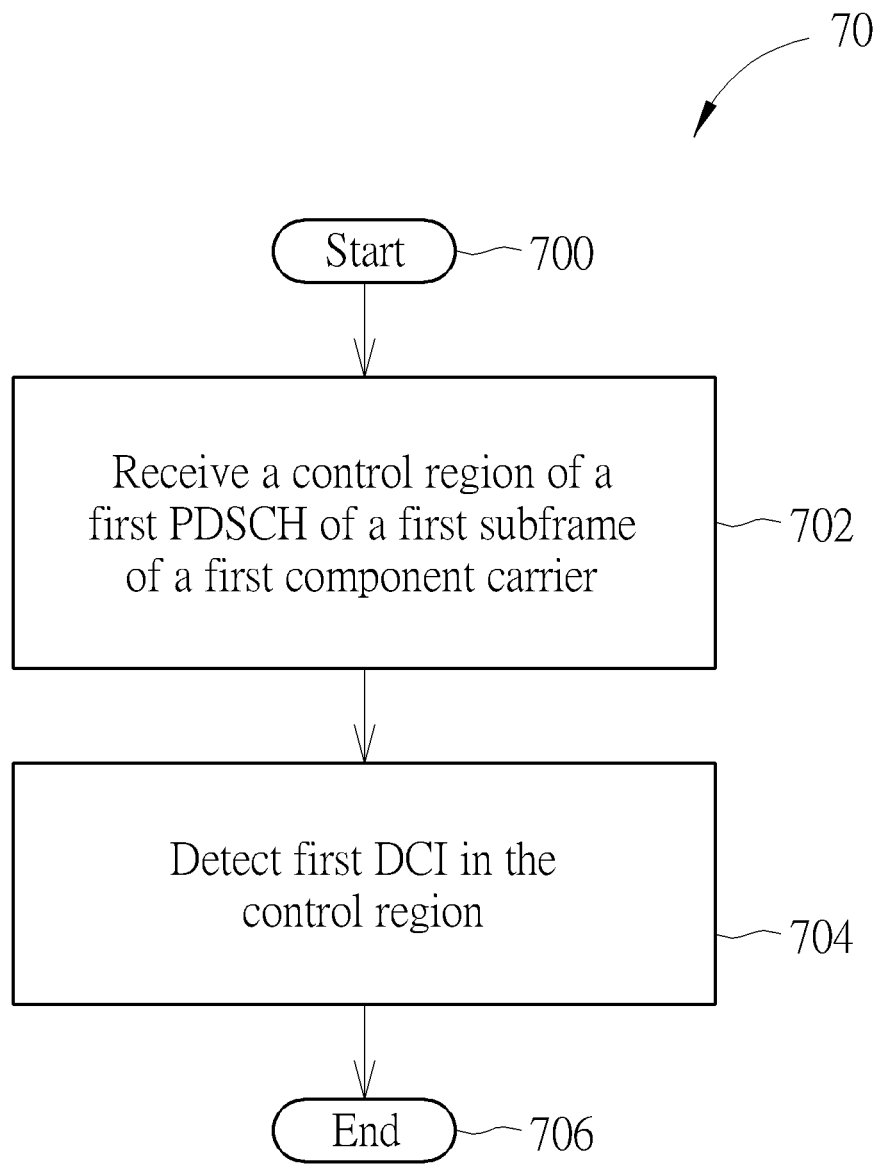
FIGS. 7-8 are flowcharts of a process according to an example of the present invention.

According to the above description, operations of the UE can be summarized into a process 70 as shown in FIG. 7. The process 70 includes the following steps:

Step 700: Start.

Step 702: Receive a control region of a first PDSCH of a first subframe of a first component carrier.

Step 704: Detect first DCI in the control region.

Step 706: End.

The process 70 is used to illustrate the operations of the UE, and detailed operations of the process 70 can be referred to the above illustration, and are not narrated herein.

Figure 8:
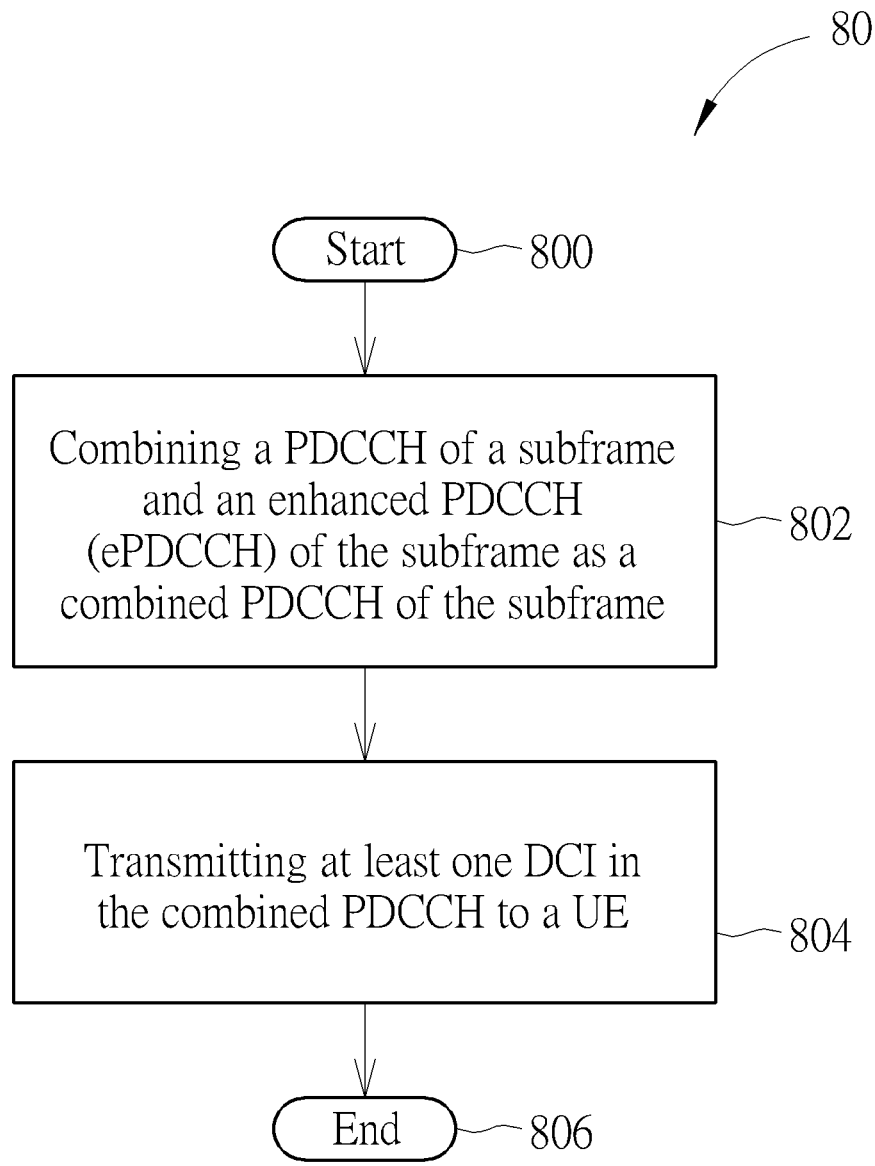

Please refer to FIG. 8, which is a flowchart of a process 80 according to an example of the present invention. The process 80 can be utilized in the network shown in FIG. 1, for handling DCI. The process 80 may be compiled into the program code 214 and includes the following steps:

Step 800: Start.

Step 802: Combining a PDCCH of a subframe and an enhanced PDCCH (ePDCCH) of the subframe as a combined PDCCH of the subframe.

Step 804: Transmitting at least one DCI in the combined PDCCH to a UE.

Step 806: End.

According to the process 80, the network combines a PDCCH of a subframe and an enhanced PDCCH (ePDCCH) of the subframe as a combined PDCCH of the subframe, and transmits at least one DCI in the combined PDCCH to a UE. Note that each of the at least one DCI may include at least one of a DCI format, an aggregation level and a candidate of the aggregation level. That is, control channel elements (CCEs) which are basic resource units of the PDCCH and enhanced CCEs (eCCEs) which are basic resource units of the ePDCCH are combined, and are used for transmitting the at least on DCI. Preferably, the ePDCCH is in a PDSCH of the subframe.

Figure 9:
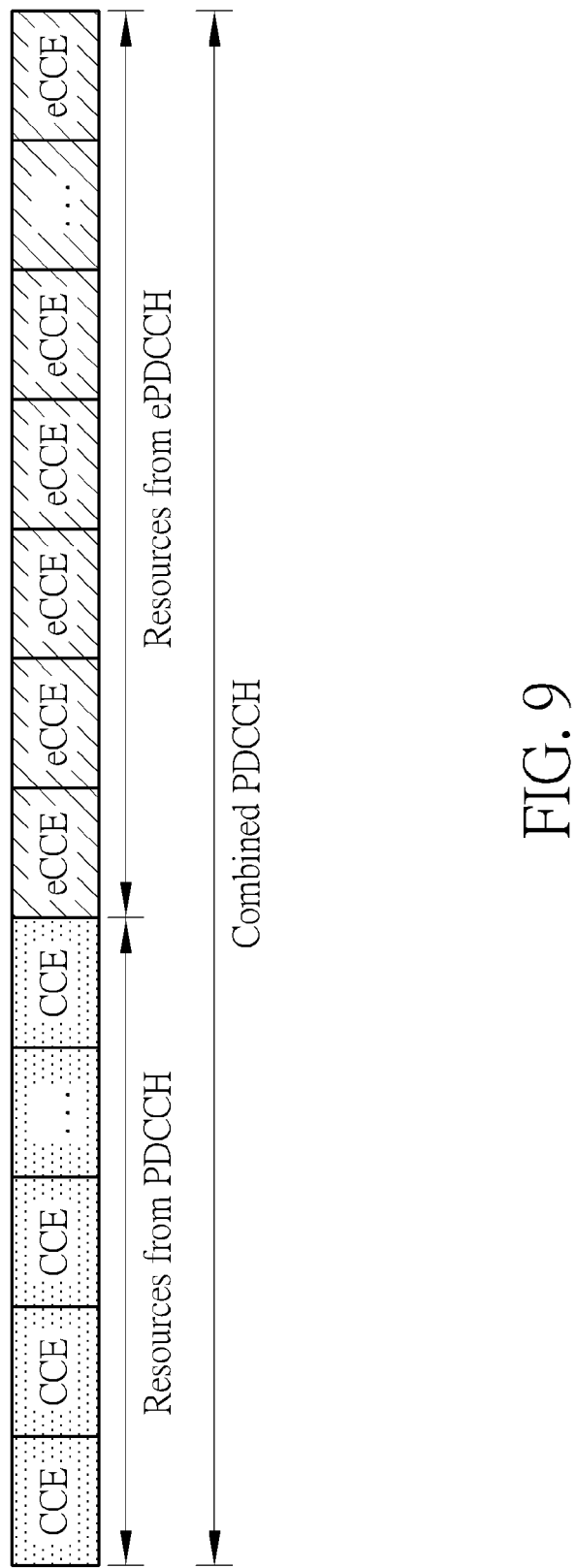
FIG. 9 is a schematic diagram of a combined PDCCH according to an example of the present invention.

Please refer to FIG. 9, which is a schematic diagram of a combined PDCCH according to an example of the present invention. As shown in FIG. 9, CCEs of the PDDCH and eCCEs of the ePDCCH are combined, and can be flexibly used for transmitting the at least on DCI.

Correspondingly, the UE detects the PDCCH of the subframe transmitted by the network, and detects the at least one DCI in the combined PDCCH. For example, the UE can perform blind detections (e.g., blind decodings) for obtaining the at least one DCI by using the combined PDCCH.

Thus, the resources of the PDCCH and the ePDCCH can be used flexibly and efficiently, and the blocking probability of the DCI can be reduced.

Figure 10:
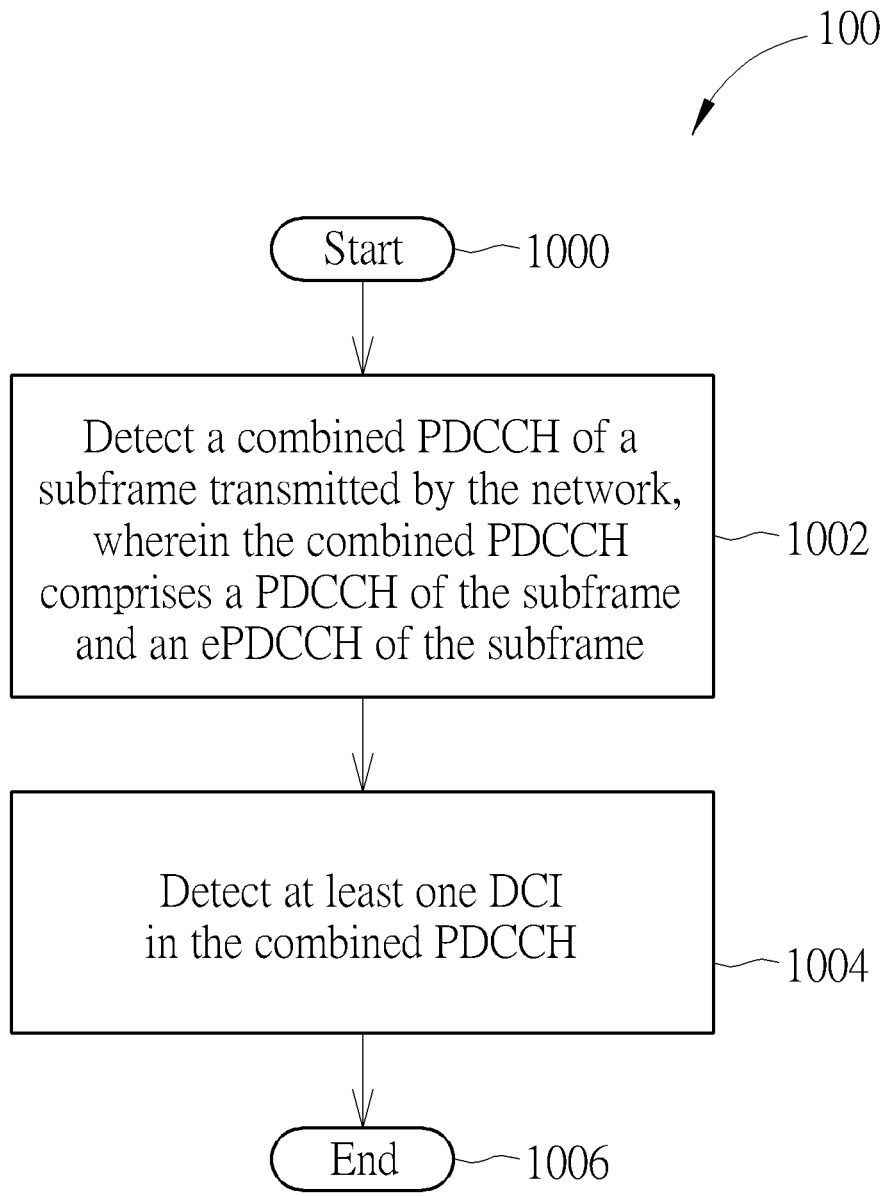
FIG. 10 is a flowchart of a process according to an example of the present invention.

According to the above description, operations of the UE can be summarized into a process 100 as shown in FIG. 10. The process 90 includes the following steps:

Step 1000: Start.

Step 1002: Detect a combined PDCCH of a subframe transmitted by the network, wherein the combined PDCCH comprises a PDCCH of the subframe and an ePDCCH of the subframe.

Step 1004: Detect at least one DCI in the combined PDCCH.

Step 1006: End.

The process 100 is used to illustrate the operations of the UE, and detailed operations of the process 100 can be referred to the above illustration, and are not narrated herein.

Those skilled in the art should readily make combinations, modifications and/or alterations on the abovementioned description and examples. The abovementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SiP), a computer on module (COM), and the communication device 30.

To sum up, the present invention provides a method for handling DCI. According to the present invention, the network can arrange resource of PDSCHs of various subframes and component carriers to the UE flexibly and efficiently. In addition, the resources of the PDCCH and the ePDCCH can be used flexibly and efficiently, and the blocking probability of the DCI can be reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of arranging downlink (DL) control information (DCI) for a network of a wireless communication system, the method comprising:
   configuring first DCI and at least one second DCI for a communication device of the wireless communication system;
   transmitting the first DCI in a physical DL control channel (PDCCH) of a first transmission time interval (TTI) of a first component carrier, for indicating a control region of a first physical DL shared channel (PDSCH) to the communication device; and
   transmitting the at least one second DCI in the control region of the first physical DL shared channel (PDSCH) of the first TTI of the first component carrier to the communication device, wherein the first DCI transmitted in the PDCCH of the first TTI of the first component carrier is different from the at least one second DCI in the control region of the first PDSCH of the first TTI of the first component carrier.

2. The method of claim 1, wherein the at least one second DCI comprises an arrangement of a second PDSCH of a second TTI of a second component carrier to the communication device.

3. The method of claim 2, wherein hybrid automatic repeat request (HARQ) resource for transmitting a HARQ corresponding to the second PDSCH is determined according to at least one of a location of the at least one second DCI and a location of the second PDSCH.

4. The method of claim 1, wherein the at least one second DCI comprises an arrangement of a physical uplink (UL) shared channel (PUSCH) of a second TTI of a second component carrier to the communication device.

5. The method of claim 1, wherein the at least one second DCI comprises an indication for power control of the communication device.

6. The method of claim 1, wherein the at least one second DCI comprises a HARQ corresponding to a PUSCH transmitted in a previous frame.

7. The method of claim 1, further comprising:
   transmitting a header in the first PDSCH of the first TTI of the first component carrier, for indicating the control region to the communication device.

8. The method of claim 7, wherein the header comprises information related to at least one of a size and a location of the control region.

9. The method of claim 7, wherein a modulation and coding scheme (MCS) of the header and the control region is different from a MCS of data transmitted in the first PDSCH.

10. The method of claim 1, wherein the first DCI comprises at least one legacy field and at least one field newly added, wherein the at least one field newly added comprises information related to at least one of a size and a location of the control region.

11. The method of claim 1, wherein a size of the control region for carrying the at least one second DCI is determined according to at least one of a modulation order and a size of the first PDSCH.

12. A method of detecting downlink (DL) control information (DCI) for a communication device of a wireless communication system, the method comprising:
   receiving, by the communication device, first DCI in a physical DL control channel (PDCCH) of a first transmission time interval (TTI) of a first component carrier, wherein the first DCI indicates a control region of a first physical DL shared channel (PDSCH); and
   receiving, by the communication device, the control region of the first physical DL shared channel (PDSCH) of the first TTI of the first component carrier; and
   detecting, by the communication device, at least one second DCI in the control region of the first PDSCH, wherein the first DCI transmitted in the PDCCH of the first TTI of the first component carrier is different from the at least one second DCI in the control region of the first PDSCH of the first TTI of the first component carrier.

13. The method of claim 12, wherein the at least one second DCI comprises an arrangement of a second PDSCH of a second TTI of a second component carrier to the communication device.

14. The method of claim 13, wherein hybrid automatic repeat request (HARQ) resource for transmitting a HARQ corresponding to the second PDSCH is determined according to at least one of a location of the at least one second DCI and a location of the second PDSCH.

15. The method of claim 12, wherein the at least one second DCI comprises an arrangement of a physical uplink (UL) shared channel (PUSCH) of a second TTI of a second component carrier to the communication device.

16. The method of claim 12, wherein the at least one second DCI comprises an indication for power control of the communication device.

17. The method of claim 12, wherein the at least one second DCI comprises a HARQ corresponding to a PUSCH transmitted in a previous frame.

18. The method of claim 12, further comprising:
   receiving a header transmitted by a network of the wireless communication system in the first PDSCH of the first TTI of the first component carrier, wherein the header indicates the control region.

19. The method of claim 18, wherein the header comprises information related to at least one of a size and a location of the control region.

20. The method of claim 18, wherein a modulation and coding scheme (MCS) of the header and the control region is different from a MCS of data transmitted in the first PDSCH.

21. The method of claim 12, wherein the first DCI comprises at least one legacy field and at least one field newly added, wherein the at least one field newly added comprises information related to at least one of a size and a location of the control region.

22. The method of claim 12, wherein a size of the control region for carrying the at least one second DCI is determined according to at least one of a modulation order and a size of the first PDSCH.

23. The method of claim 2, wherein the first TTI and the second TTI are the same TTI or different TTIs.

24. The method of claim 2, wherein the first component carrier and the second component carrier are the same component carrier or different component carriers.

25. The method of claim 13, wherein the first TTI and the second TTI are the same TTI or different TTIs.

26. The method of claim 13, wherein the first component carrier and the second component carrier are the same component carrier or different component carriers.

* * * * *